June 3, 1969  G. KIPER  3,447,431
MANUALLY AND AUTOMATICALLY OPERABLE CAMERA
Filed Feb. 8, 1966  Sheet 1 of 3

INVENTOR.
GERD KIPER
BY
Michael S. Striker

June 3, 1969  G. KIPER  3,447,431
MANUALLY AND AUTOMATICALLY OPERABLE CAMERA
Filed Feb. 8, 1966

INVENTOR.
GERD KIPER
BY
Michael S. Striker

United States Patent Office 3,447,431
Patented June 3, 1969

3,447,431
MANUALLY AND AUTOMATICALLY OPERABLE CAMERA
Gerd Kiper, Munich, Germany, assignor to Agfa-Gevaert AG., Leverkusen, Germany
Filed Feb. 8, 1966, Ser. No. 525,876
Claims priority, application Germany, Feb. 13, 1965,
A 48,393
Int. Cl. G01j 1/10
U.S. Cl. 95—10    20 Claims

ABSTRACT OF THE DISCLOSURE

A camera wherein the scanning member for the needle of the exposure meter transmits motion to the diaphragm setting ring by way of two elements which are spaced from each other in idle position of the setting ring. A selector is provided to adjust the distance between the two elements prior to movement of the scanning member into engagement with the needle.

---

The present invention relates to cameras in general, and more particularly to improvements in cameras of the type wherein the size of the diaphragm opening and/or the exposure time may be selected manually or in a fully automatic way as a function of the intensity of light coming from a viewed scene or subject.

It is an important object of the present invention to provide a very simple, compact and rugged camera which includes a diaphragm and a shutter and wherein both of these components may be adjusted either manually or automatically.

Another object of the invention is to provide a camera wherein automatic selection of the one and/or the other exposure value (i.e., the size of the diaphragm opening and/or the exposure time) may be corrected by the operator to produce certain special effects, for example, to take pictures while the lens faces a source of light or to reduce the contrasts between shaded and lighted areas of the picture.

A further object of the invention is to provide a camera of the just outlined characteristics wherein the automatic selection of exposure values may be corrected or altered without necessitating movement of the diaphragm and/or shutter setting means from their normal starting or idle positions.

An additional object of my invention is to provide a camera wherein the automatic selection of exposure values may be altered by the operator independently of such adjustments which are made in dependency on the speed of the film so that the exposure values may be influenced by the speed of the film without affecting adjustments or corrections of the automatic selection which is made by the camera in dependency on the intensity of light coming from a viewed scene or subject.

A concomitant object of the invention is to provide a novel selector system which may be utilized in the above outlined camera to correct or alter the automatic selection and to effect manual selection of exposure values.

A further object of the invention is to provide a camera wherein the size of an automatically selected diaphragm opening and/or automatically selected exposure time may be altered or corrected to account for a plurality of factors which might influence the quality of an exposure.

An additional object of the invention is to provide a novel motion transmitting connection between the built-in exposure meter and the exposure value selecting device of a still camera.

Another object of my invention is to provide a camera wherein the just outlined connection can be rendered ineffective in automatic response to manual selection of exposure values.

An additional object of the invention is to provide a camera wherein the improved connection cannot interfere with automatic adjustments of the exposure meter to account for the sensitivity of film which is being utilized in the camera.

Another object of the invention is to provide a camera which constitutes an improvement over and a further development of cameras disclosed in U.S. Patents Nos. 3,056,340 and 3,190,203 which are assigned to the same assignee.

An ancillary object of the invention is to provide a novel system of scales, indexes and other adjustment-facilitating means which may be utilized in the improved camera to allow for rapid and accurate adjustment of automatically selected exposure values and/or for manual selection of such values.

Still another object of the present invention is to provide a still camera wherein the motion transmitting connection between the exposure meter and the exposure value selecting or setting means may be interrupted and reestablished in a very simple and time saving manner, and wherein such connection occupies very little room so that it adds nothing or very little to the bulk of the camera.

Briefly stated, one feature of my present invention resides in the provision of a camera which comprises adjustable exposure value setting means including a setting member movable from an idle position to thereby select one of a plurality of exposure values (namely, one of several sizes of the diaphragm opening and/or one of several exposure times), an exposure meter having a preferably needle-like output member movable between a plurality of positions each of which is indicative of a different light intensity, and a motion transmitting connection between the output member and the setting member including a scanning member which is movable from an idle position into engagement with the output member so that, on engagement with the output member, its position is a function of the intensity of light coming from a viewed scene or subject, such intensity being measured by the exposure meter, a driven element movable with the setting member, and a driving element movable with the scanning member and being spaced from the driven element in the idle position of the setting member. One of the two elements is adjustable with reference to the other element to change the distance therebetween and to thereby change the extent of movement of the setting member from idle position (and the exposure value) in response to movement of the scanning member into engagement with the output member. The camera further comprises one or more preferably manually operable selectors which can adjust the one element with reference to the other element. Thus, by the very simple expedient of transmitting motion from the output member to the setting member of the exposure value selecting means through the intermediary of the connection which comprises two relatively movable elements one of which can be adjusted with reference to and is normally spaced from the other element, I can correct the automatic selection of the diaphragm opening and/or exposure times by changing the initial distance between the two elements.

In accordance with another feature of my invention, the selector which changes the distance between the two elements of the motion transmitting connection may move one of the elements to a series of such positions in which the two elements cannot engage each other when the scanning member engages the output member of the exposure meter. The selector then preferably comprises a portion which can adjust the exposure value selecting means in response to movement of the one element away from the other element to such an extent that the exposure meter cannot select the exposure value. Such adjustment of the exposure value selecting means by a portion of the selector can be carried out by observing a fixed scale and an index provided on the selector. In this way, the operator can rapidly convert the camera for manual or automatic selection of exposure values merely by changing the distance between the two elements of the motion transmitting connection between the exposure meter and the exposure value selecting means and by adjusting the exposure value selecting means directly by the selector when the aforementioned connection is ineffective.

The exposure value selecting means may comprise two diaphragm setting means at least one of which is rotatable about the optical axis to thereby change the size of the diaphragm opening and to change the exposure time through a cam-and-follower connection and a retard unit which later directly controls the shutter.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

Figure 1:
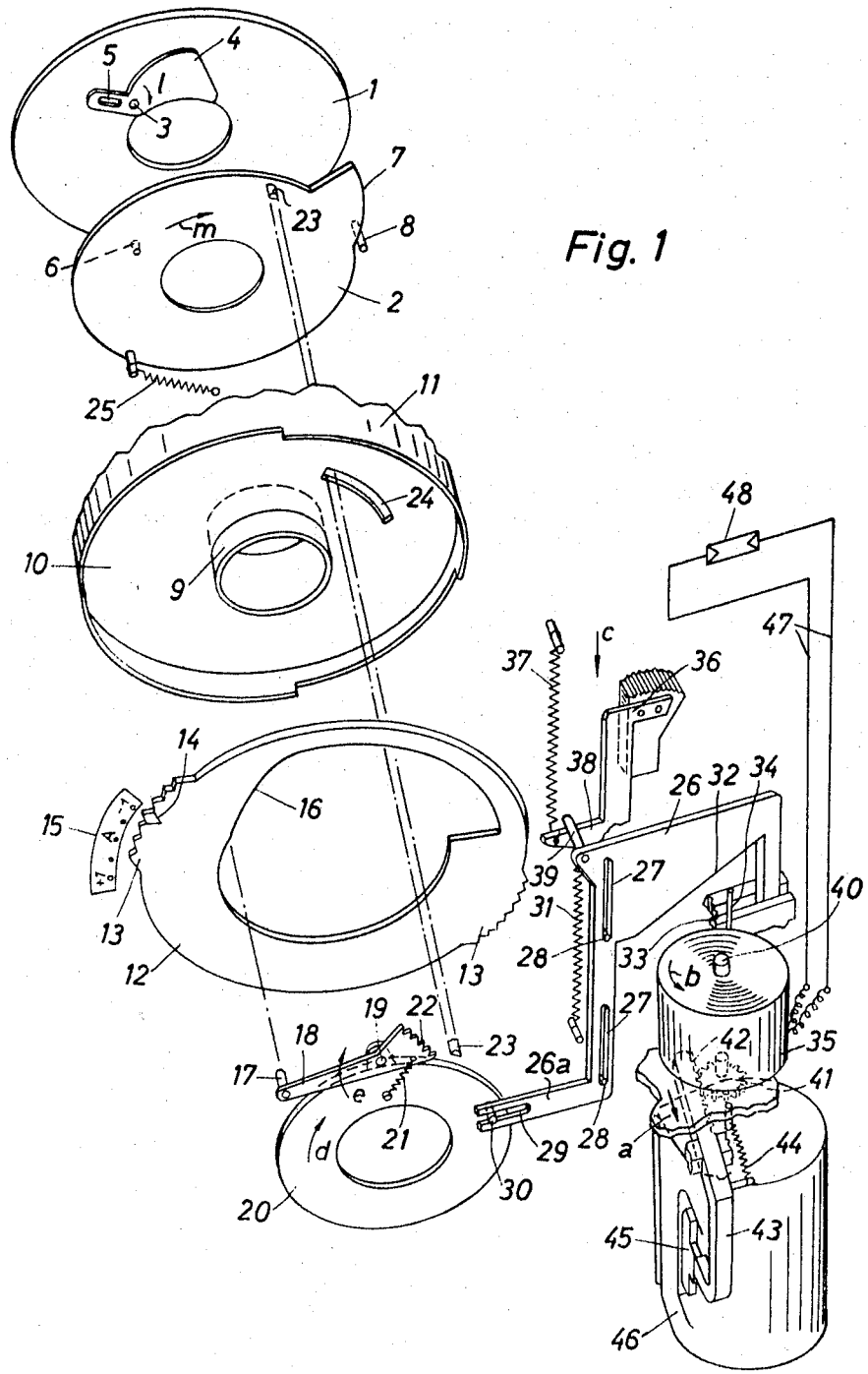
FIG. 1 is an exploded perspective view of a mechanism which can be utilized in a still camera and which embodies one form of my invention.

Referring first to FIG. 1, there is shown a portion of a camera which comprises an adjustable exposure value selecting device including a fixed diaphragm setting ring 1 and a movable diaphragm setting ring 2. The ring 1 carries pins 3 each of which pivotably supports a diaphragm blade 4 and each of these blades has a slot 5 for one of a series of pins 6 which are attached to the movable setting ring 2. For the sake of clarity, FIG. 1 merely shows a single diaphragm blade 4. The movable setting ring 2 is rotatable about the optical axis and is provided with an exposure time selecting cam 7 which cooperates with a pin-shaped follower 8 forming part of a retard unit of known design which directly controls the shutter. The rings 1 and 2 are mounted on a tubular support 9 which is affixed to a plate-like carrier 10. This carrier 10 is further provided with a second tubular support 11 which is concentric with and surrounds the support 9. The outer tubular support 11 carries a rotary selector ring 12 which is provided with serrated marginal portions 13 serving to facilitate rotation of the selector ring by the operator's fingers. An index 14 on the selector ring 12 is movable along a fixed scale 15 whose graduations represent various correction factors.

The selector ring 12 is further provided with a cam 16 which cooperates wtih a pin-shaped follower portion 17 forming part of a driving element here shown as a two-armed lever 18, the latter further having a toothed second portion 22 which in turn cooperates with a driven element in the form of a flattened post 23. The post 23 is attached to the rotary setting ring 2 and extends through a slot 24 in the carrier 10. The ring 2 is biased by a return spring 25 which tends to maintain it in a starting or idle position in which the post 23 rests in one longitudinal end of the slot 24.

Automatic selection of the exposure time and diaphragm opening is effected through the intermediary of a motion transmitting connection which includes the aforementioned elements 18, 23 and a slide 26 provided with straight elongated guide slots 27 for fixed guide pins 28. An open slot 29 which is provided in a bent-over arm 26a of the slide 26 receives a coupling pin 30 mounted on a rotary control ring 20, the latter also carrying a pivot pin 19 for the driving lever 18 and a spring 21 which tends to bias the lever 18 in a clockwise direction as indicated in FIG. 1 by an arrow $e$. The purpose of the spring 21 is to bias the follower portion 17 against the cam 16 of the selector ring 12.

The slide 26 is connected with a spring 31 which biases a scanning member 32 of the slide against the needle-like output member 34 of a moving-coil instrument 35. The output member 34 is turnable along a fixed back support 33. A release trigger 36 is biased by a return spring 37 whose bias is stronger than that of the spring 31. The trigger 36 comprises a projection or arm 38 which is engaged by a projection or pin 39 of the slide 26 whereby the spring 31 insures that the projections 38, 39 normally remain in actual abutment with each other. When the trigger 36 assumes its normal starting position, the bias of the spring 37 prevails and the scanning member 32 of the slide 26 is held in an idle position at a distance from the output member 34 so that the latter is free to swing in front of the back support 33.

The moving-coil instrument 35 forms part of the built-in exposure meter and is turnable about the axis of a fixed shaft 40. The instrument 35 is rigid with a pinion 41 which meshes with the rack 42 of a U-shaped adjusting or calibrating member 43. The member 43 is biased by a spring 44 which tends to maintain it in abutment with a marker 45 provided on a film cartridge or magazine 46 when the latter is properly inserted into the housing of the camera. Depending on the positioning of the marker 45 with reference to the remainder of the cartridge 46, the adjusting member 43 is moved to a greater or lesser degree in the direction indicated by an arrow $a$ and thereby effects a greater or lesser angular displacement of the instrument 35 in the direction indicated by an arrow $b$. The positioning of the marker 45 reflects the sensitivity (speed) of the film which is stored in the cartridge 46 so that, in response to proper insertion of the cartridge into its chamber, the member 43 automatically adjusts or calibrates the moving-coil instrument 35 to account for the film speed. The exposure meter further comprises a conventional photosensitive element 48 which is connected with the instrument 35 by means of conductors 47 and can cause the output member 34 to assume an angular position which is a function of the intensity of light impinging against the element 48. The latter may be a photoelectric resistor or a photoelectric cell.

In order to take a picture with automatic selection of exposure time and diaphragm opening, the operator depresses the release trigger 36 in the direction indicated by an arrow $c$. The slide 26 follows such movement of the trigger 36 under the bias of the spring 31 until the scanning member 32 reaches the output member 34 and presses the latter against the back support 33. The scanning member 32 is inclined and the angular position of the output member 34 is a function of the intensity of light coming from a viewed scene or subject so that the angular position of the control ring 20 is also a function of such intensity. The ring 20 is turned (see the arrow $d$) by the arm 26a of the slide 26 and through the intermediary of the coupling pin 30. In response to such angular displacement of the control ring 20, the toothed portion 22 of the driving element or lever 18 moves toward and engages the driven element or post 23 which latter enters the gap between two adjoining teeth of the portion 22 and thereupon participates in rotation of the control ring 20 (arrow $d$) until the scanning member 32 actually reaches the output member 34. Consequently, the setting ring 2 leaves its idle position against the bias of the spring 25 and changes the position of diaphragm blades 4 (see the arrow $l$). At the same time, cam 7 of the setting ring 2 moves the follower pin 8 of the retard unit. Such movement of the setting 2 in the direction indicated by an arrow $m$ reduces the size of the diaphragm opening and shortens the exposure time.

In order to correct the exposure value, the selector ring 12 is turned by hand until the index 14 registers with a selected graduation on the scale 15. For example, and as actually shown in FIG. 1, the index 14 may be moved into registry with the graduation −1 on the scale 15 so that the driving lever 18 assumes an angular position in which a short travel of its toothed portion 22 suffices to reach the post 23 which means that the angular displacement of the setting ring 2 will be greater and the exposure time and the size of the diaphragm opening are reduced accordingly. On the other hand, and if the index 14 is moved into registry with the graduation +1 on the scale 15, the lever 18 is caused to turn in the direction of the arrow *e* whereby the toothed portion 22 must cover a greater distance before it actually reaches the post 23 to effect a change in the angular position of the setting ring 2. In other words, the shorter is the distance which the toothed portion 22 of the lever 18 must cover on its way into actual engagement with the post 23, the greater is the reduction in the size of the diaphragm opening provided, of course, that the intensity of light which impinges against the photosensitive element 48 remains unchanged.

The shutter is released and the camera makes an exposure when the trigger 36 is moved all the way to its fully depressed position. The scanning member 32 of the slide 26 follows such movement of the trigger 36 only to the extent determined by the angular position of the output member 34.

Figure 2:
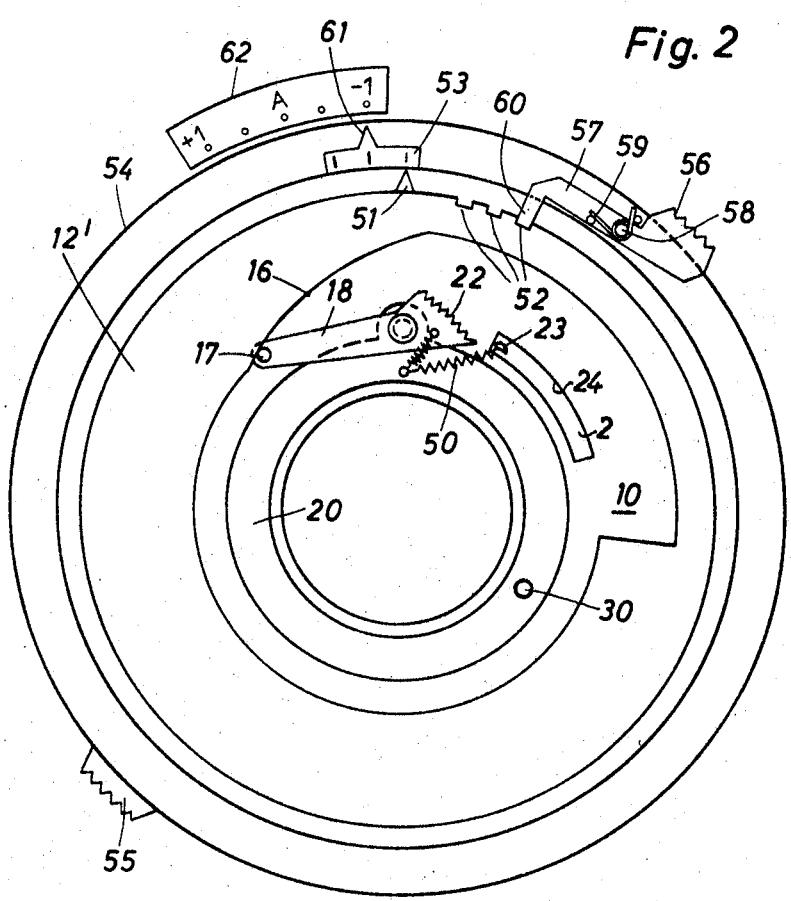
FIG. 2 is a fragmentary front elevational view of a modified mechanism.

FIG. 2 illustrates a portion of a modified camera. The control ring 20 carries a pin 30 which is coupled to the arm 26a of the slide 26 (not shown in FIG. 2) in the same way as described in connection with FIG. 1. The driving lever 18 is mounted on the control ring 20 in the previously described manner and its toothed portion 22 can transmit motion to the driven element or post 23 of the rotary setting ring 2. The spring 25 of FIG. 1 is replaced by a spring 50 which connects the post 23 with the control ring 20. Such arrangement allows for the utilization of a weaker return spring 37 for the release trigger 36 (not shown in FIG. 2) so that the operator must exert a lesser pressure in order to make an exposure.

The follower portion 17 of the lever 18 tracks the face of the cam 16 on a slightly modified selector ring 12' which is provided with an index 51 movable into registry with the graduations of a scale 53. In addition, the selector ring 12' comprises a toothed coupling portion 52. The graduations of the scale 53 may represent several factors which can influence the exposure value, such as filter factors and/or film sensitivity. The scale 53 is not fixed but is mounted on a second adjustable ring-shaped selector 54 which is provided with serrated portions 55, 56 to be readily rotated by hand about the optical axis of the lens system. The serrated portion 56 forms part of a coupling lever 57 which can enter one of the notches between the teeth of the coupling portion 52 on the selector ring 12'. The pivot pin 58 for the coupling lever 57 is mounted on the selector 54 and the lever 57 is permanently biased by a torsion spring 59 which tends to rotate this lever in a counterclockwise direction, as viewed in FIG. 2, so as to urge the pallet 60 of the lever into engagement with the coupling portion 52. The selector 54 carries an index 61 which is movable along a fixed scale 62 corresponding to the scale 15 of FIG. 1 and having graduations distributed in the same way. The graduation A indicates that the camera mechanism is set for automatic selection of exposure values. It is preferred to mount the first selector ring 12' in such a way that it must overcome at least some friction when moved about the optical axis and/or to provide detents for holding the selector ring 12' in each of its angular positions.

In the camera of FIG. 2, the driving lever 18 may be adjusted by changing the angular position of the index 51 with reference to the scale 53 and/or by changing the position of the index 61 with reference to the scale 62. This means that the exact selection of the exposure value may be influenced by a plurality of factors. If the selector 54 is to remain stationary and the position of the driving lever 18 with reference to the post 23 is to be adjusted in response to angular displacement of the selector ring 12', the operator depresses the serrated portion 56 to rock the coupling lever 57 against the bias of the spring 59 and to disengage the pallet 60 from the toothed coupling portion 52. The selector ring 12' is then free to rotate with reference to the selector 54. When the pallet 60 is in operative position and the selector 54 is rotated by hand, the coupling lever 57 transmits motion to the selector ring 12' and the latter transmits motion to the driving lever 18 via follower portion 17 and cam 16.

Figure 3:
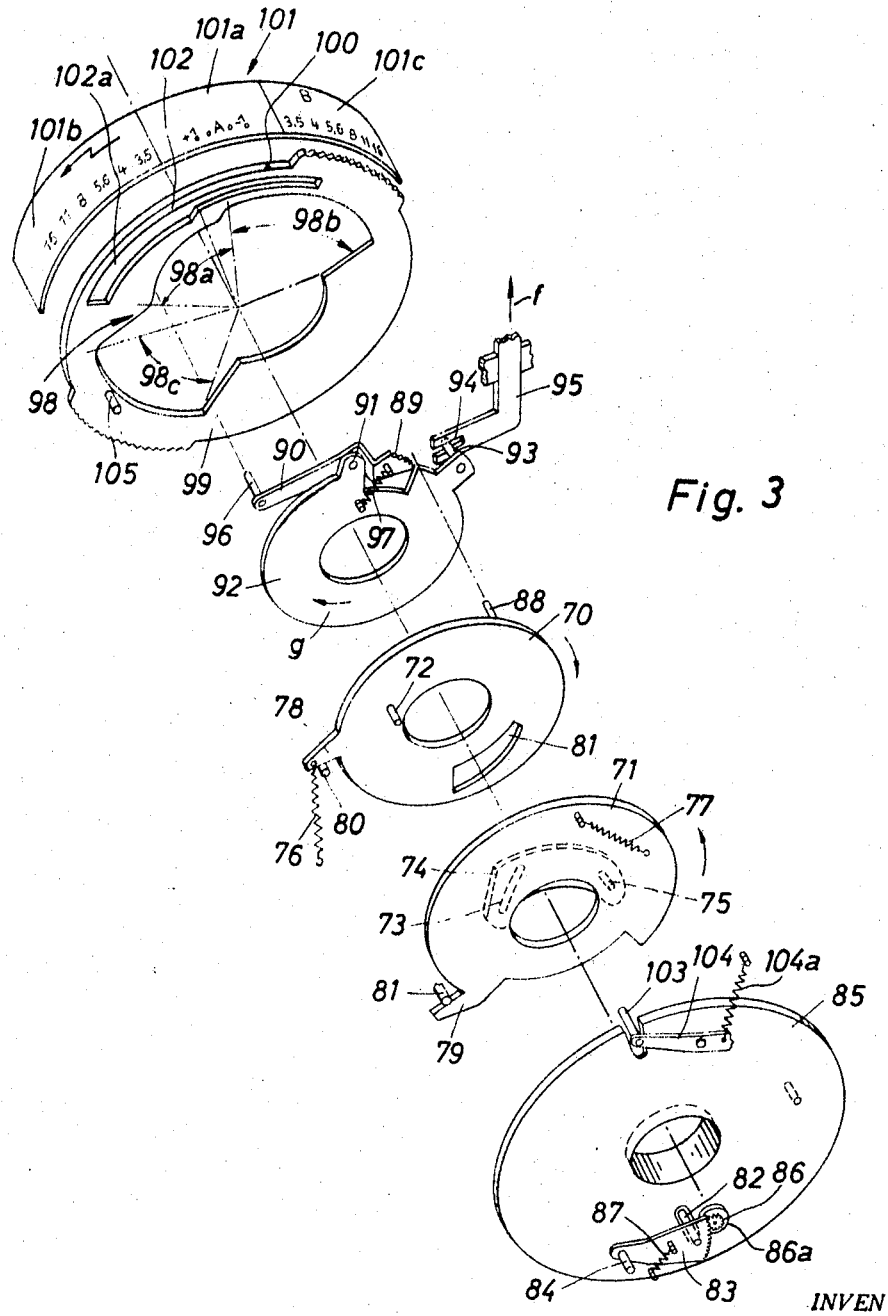
FIG. 3 is an exploded perspective view of a third mechanism.

FIG. 3 shows a portion of a third camera whose exposure value selecting device comprises two rotary diaphragm setting rings 70, 71. The ring 70 carries pins 72 which extend into slots 73 of diaphragm blades 74. Pins 75 of the blades 74 are fixed to the ring 71. For the sake of clarity, FIG. 3 merely shows a single diaphragm blade 74. The rings 70, 71 are respectively biased to idle positions by helical return springs 76, 77. The spring 76 tends to rotate the ring 70 in a counterclockwise direction so that a projection 78 of the ring 70 normally abuts against a fixed stop pin 80. The spring 77 tends to turn the ring 71 in a clockwise direction and to maintain a projecting arm 79 of the ring 71 in abutment with a fixed stop pin 81.

The ring 70 is provided with a cam 81 whose face is tracked by a follower 82 on a lever 83 forming part of a retard unit for the shutter. The lever 83 is rockable on a pivot pin 84 which is mounted on a fixed plate-like carrier 85. A toothed segment of the lever 83 meshes with a pinion 86 which is connected with a mass or flywheel 86a. A spring 87 biases the lever 83 in a clockwise direction to maintain the follower 82 in contact with the cam 81 of the setting ring 70. In a manner well known per se, the lever 83 cooperates with a ring for the shutter blades, not shown.

The setting ring 70 further carries a driven element or post 88 which corresponds to the post 23 of FIG. 1 and may be engaged by the toothed portion 89 of a driving element or lever 90 mounted on a pivot 91 of a control ring 92. The control ring 92 is coupled with the slide 95 by a pin and slot connection 93, 94 corresponding to the connection 30, 29 of FIG. 1. The slide 95 corresponds to the slide 26 of FIG. 1.

The lever 90 comprises a follower portion 96 which tracks the face of a cam 98 provided on a rotary selector ring 99. The follower 96 is permanently biased against the cam 98 by a helical spring 97 which operates between the control ring 92 and the lever 90. An index 100 of the selector ring 99 is movable into registry with the graduations on a fixed scale 101 which is subdivided into three sectors including a median or central sector 101a and two outer sectors 101b, 101c. A graduation on the median sector 101a will register with the index 100 when the camera is set for automatic selection of exposure values. The graduations −1 and +1 on the sector 101a will register with the index 100 when the operator intentionally corrects or influences the automatic selection of exposure values in a manner as described in connection with the scale 15 of FIG. 1. The sector 101b will register with the index 100 when the camera is set for taking pictures with flash illumination, and the sector 101c will register with the index 100 when the operator manually selects the exposure time.

The selector ring 99 comprises a motion transmitting portion 105 which can engage the projection 78 or 79 to thereby turn the ring 70 or 71. In addition, the selector ring 99 comprises a cam slot 102 which is bounded by a cam face adapted to be tracked by a follower 103 provided on a conventional exposure time selecting lever 104. The latter is biased by a helical spring 104a so that the follower 103 bears against the cam face in the cam slot 102. In a manner well known from the art, the operator can adjust the lever 104 to thereby determine the exposure time.

FIG. 3 shows the camera mechanism in a position its parts assume prior to automatic selection of exposure values with a correction factor −1 (see the position of the index 100 with reference to the median sector 101a of the scale 101). When the release trigger is depressed, the slide 95 is displaced in a direction counter to that indicated by an arrow f to rotate the control ring 92 in a direction as indicated by an arrow g. After a short interval, the toothed portion 89 of the driving lever 90 reaches the post 88 and entrains the setting ring 70 so that the latter rotates in a clockwise direction and moves its projection 78 away from the stop 80. Such movement of the ring 70 results in a reduction of the diaphragm opening and the cam 81 of the ring 70 causes the retard unit including the lever 83 to shorten the exposure time. By moving the index 100 with reference to the median sector 101a of the scale 100, the operator can correct the automatic selection of exposure values in that the distance between the toothed portion 89 and the post 88 is either reduced or increased, depending upon whether the index 100 is moved into registry with the graduation −1 or +1.

If the index 100 is moved into registry with a graduation on the sector 101c, the follower portion 96 is moved away from the section 98a of the cam 98 on the selector ring 99 and engages the cam section 98c. The configuration of the cam section 98c is such that the lever 90 can follow the bias of the spring 97 and assumes a position in which its toothed portion 89 cannot reach the post 88 regardless of rotation of the control ring 92. In other words, the motion transmitting connection between the exposure meter and the diaphragm and shutter is ineffective. By rotating the selector ring 99 to such an extent that the follower portion 96 engages the cam section 98c, the operator causes the portion 105 of the selector 99 to move the projection 78 of the setting ring 70 away from the stop 80 whereby the ring 70 rotates in the direction indicated by the arrow g and the size of the diaphragm opening is selected in advance. The adjustment is facilitated by the sector 101c whose graduations are indicative of different diaphragm openings. At the same time, the pin 103 of the exposure time selector lever 104 enters the enlarged portion 102a of the cam slot in the selector ring 99. Therefore, the lever 104 maintains the shutter in open position as long as the operator maintains the release trigger in fully depressed position.

The section 98b of the cam 98 is configurated in such a way that, when engaged by the follower portion 96 of the lever 90, the latter assumes a position in which its toothed portion 89 cannot reach the post 88 on the setting ring 70 even in response to rotation of the control ring 92 on displacement of the slide 95 in the direction counter to that indicated by the arrow f. When the index 100 registers with a graduation on the scale sector 101b (i.e., when the follower portion 96 engages the cam section 98b), the camera is ready for manual selection of exposure values such as is desirable for taking pictures with flash illumination. The graduations of the scale sector 101b indicate different sizes of the diaphragm opening and, when the index 100 registers with one of these graduations, the motion transmitting portion 105 of the selector ring 99 moves the projection 79 of the setting ring 71 away from the stop 81 so that the size of the diaphragm opening is the same as that indicated by the marker 100.

It is clear that the camera of my invention is susceptible of many additional modifications which are not shown in the drawings. For example, for driving lever 18 or 90 could be replaced by a reciprocable carriage and the mechanism could include a different type of diaphragm and/or shutter.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a camera, adjustable exposure value selecting means including a setting member movable from an idle position to thereby select one of a plurality of exposure values; an exposure meter having an output member movable between a plurality of positions each of which is indicative of a different light intensity; a motion transmitting connection between said output member and said setting member including a scanning member movable from an idle position into engagement with said output member, a driven element movable with said setting member, and a driving element movable with said scanning member, said elements being spaced apart in the idle position of said setting member and one thereof being adjustable with reference to the other element to change the distance therebetween and to thereby change the extent of movement of said setting member from idle position in response to movement of said scanning member into engagement with said output member; and selector means for adjusting said one element.

2. A structure as set forth in claim 1, wherein said selector means is arranged to adjust the distance between said elements in such a way that said one element remains spaced from said other element when the output member is engaged by said scanning member so that the exposure meter cannot select the exposure value.

3. In a camera, adjustable exposure value selecting means including a setting ring rotatable about the optical axis from an idle position to thereby select one of a plurality of exposure values; an exposure meter having an output member movable between a plurality of positions each of which is indicative of a different light intensity; a motion transmitting connection between said output member and said setting ring including a scanning member movable from an idle position into engagement with said output member, a driven element movable with said setting ring, a driving element movable with said scanning member, said elements being spaced apart in the idle position of said setting ring and one thereof being adjustable with reference to the other element to change the distance therebetween and to thereby change the extent of movement of said setting member from idle position in response to movement of said scanning member into engagement with said output member, and a control ring rotatable about said axis and supporting said one element, said other element being rigid with said setting ring and said exposure value selecting means further comprising resilient means for biasing said setting ring and said scanning member to idle positions; and selector means for adjusting said one element.

4. In a camera, adjustable exposure value selecting means including a setting member movable from an idle position to thereby select one of a plurality of exposure values; an exposure meter having an output member movable between a plurality of positions each of which is indicative of a different light intensity; a motion transmitting connection between said output member and said setting member including a scanning member movable from an idle position into engagement with said output member, a driven element movable with said setting member, a driving element movable with said scanning member, said elements being spaced apart in the idle position of said setting member and one thereof being adjustable with reference to the other element to change the distance therebetween and to thereby change the extent of movement of said setting member from idle position in response to movement of said scanning member into engagement with said output member, and a control member coupled to said scanning member; and selector means for adjusting said one element, said selector means comprising a movable cam and said one element comprising a lever rockable on said control member and having a first portion tracking said cam and a second portion movable into engagement with said other element.

5. In a camera, adjustable exposure value selecting means including a setting member movable from an idle position to thereby select one of a plurality of exposure values; an exposure meter having an output member movable between a plurality of positions each of which is indicative of a different light intensity; a motion transmitting connection between said output member and said setting member including a scanning member movable from an idle position into engagement with said output member, a driven element movable with said setting member, and a driving element movable with said scanning member, said elements being spaced apart in the idle position of said setting member and one thereof being adjustable with reference to the other element to change the distance therebetween and to thereby change the extent of movement of said setting member from idle position in response to movement of said scanning member into engagement with said output member; and selector means for adjusting said one element, said selector means comprising a plurality of selectors each arranged to adjust said one element with reference to the other element.

6. A structure as set forth in claim 5, wherein said selector means comprises two concentric ring-shaped selectors one of which is arranged to adjust said one element through the intermediary of the other selector.

7. A structure as set forth in claim 6, wherein said connection further comprises a control ring concentric with said selectors and coupled with said scanning member to rotate when the scanning member moves to and from idle position, said one element being adjustably supported by said control ring and including a follower portion and a second portion movable into engagement with said other element, said selector means further including a cam provided on said other selector and tracked by said follower portion, a first graduated scale provided on said one selector, a first index provided on said other selector and movable into registry with selected graduations of said first scale in response to manual rotation of said other selector, a fixed second graduated scale adjacent to said one selector, a second index provided on said one selector and movable into registry with selected graduations of said second scale in response to manual rotation of said one selector, and releasable coupling means connecting said selectors.

8. In a camera, adjustable exposure value selecting means including a setting member movable from an idle position to thereby select one of a plurality of exposure values; an exposure meter having an output member movable between a plurality of positions each of which is indicative of a different light intensity; a motion transmitting connection between said output member and said setting member including a scanning member movable from an idle position into engagement with said output member, a driven element movable with said setting member, and a driving element movable with said scanning member, said elements being spaced apart in the idle position of said setting member and one thereof being adjustable with reference to the other element to change the distance therebetween and to thereby change the extent of movement of said setting member from idle position in response to movement of said scanning member into engagement with said output member; and selector means for adjusting said one element, said selector means being arranged to adjust the distance between said elements in such a way that said one element remains spaced from said other element when the output member is engaged by said scanning member so that the exposure meter cannot select the exposure value, and said selector means comprising means for adjusting said exposure value selecting means when the exposure meter cannot select the exposure value.

9. A structure as set forth in claim 8, wherein said selector means comprises a ring-shaped selector rotatable about the optical axis and including a multi-section cam, said one element comprising a follower which tracks a first section of said cam when said one element can reach said other element in response to engagement of said output member by said scanning member, said follower tracking another section of said cam when said one element cannot reach said other element.

10. A structure as set forth in claim 9, wherein said cam comprises three cam sections and said one section is located between the remaining two sections, each of said remaining cam sections being configurated in such a way that, when tracked by said follower, said one element cannot engage said other element in response to engagement of said output member by said scanning member.

11. A structure as set forth in claim 9, wherein said exposure value selecting means comprises two setting rings concentric with said selector and movable to and from idle positions to thereby change the size of the diaphragm opening and the exposure time, said selector comprising a portion which moves one of said setting rings from idle position when said follower tracks one of said remaining cam sections and which moves the other setting rings from idle position when said follower tracks the other of said remaining cam sections.

12. A structure as set forth in claim 11, wherein said selector means further comprises a graduated scale adjacent to said selector and an index provided on said selector and movable into registry with selected graduations on said scale in response to manual rotation of said selector.

13. In a camera, an adjustable diaphragm comprising a first and a second setting ring each rotatable about the optical axis from an idle position to thereby change the size of the diaphragm opening, and resilient means for biasing said rings to idle positions; a shutter normally coupled with said first setting ring to change the exposure time in response to movement of said first ring from idle position; a built-in exposure meter having a needle movable to a plurality of positions each of which is indicative of a different light intensity; a motion transmitting connection between said exposure meter and said diaphragm including a scanning member movable from an idle position into engagement with said needle, a driven element on one of said setting rings, and a driving element coupled with said scanning member and spaced from said driven element in the idle position of said scanning member; and manually adjustable selector means for changing the distance between said elements so that said driving element can engage said driven element to thereby rotate said one setting ring in response to movement of said scanning member into engagement with said needle when said selector means is moved by hand to one of a first series of positions and that said driven element is out of the path of movement of said driving element when said selector means is moved to one of a second series of positions.

14. A structure as set forth in claim 13, wherein said selector means comprises a motion transmitting portion which moves one of said setting rings from idle position in each of said second series of positions of said selector means.

15. A structure as set forth in claim 13, wherein said driving element comprises a follower portion and said selector means comprises a cam tracked by said follower portion to change the distance between said elements in response to manual adjustment of said selector means to one of said first series of positions.

16. A structure as set forth in claim 15, wherein said selector means is a ring which is concentric with said setting rings and said driving element is a lever which is rockable on a control ring concentric with said setting rings and coupled to said scanning member.

17. A structure as set forth in claim 13, wherein said shutter comprises a retard unit having a follower and one of said setting rings comprises a cam tracked by said follower to adjust said retard unit in response to movement of said last mentioned setting ring from idle position.

18. A structure as set forth in claim 13, further comprising trigger means for moving said scanning member from idle position and resilient means for biasing said scanning member to idle position.

19. A structure as set forth in claim 13, further comprising means for calibrating said exposure meter in dependency on the sensitivity of film which is being utilized in the camera.

20. A structure as set forth in claim 19, wherein said exposure meter comprises a moving-coil instrument including said needle and rotatable with the needle about a predetermined axis, said calibrating means comprising means for rotating said instrument about said axis in response to insertion of a film cartridge into the camera.

References Cited

UNITED STATES PATENTS

| | | | |
|---|---|---|---|
| 3,078,772 | 2/1963 | Goshima | 95—10 |
| 3,148,604 | 9/1964 | Rentschler | 95—10 |
| 3,162,111 | 12/1964 | Koppen et al. | |
| 3,176,598 | 4/1965 | Muller et al. | 95—10 |
| 3,213,773 | 10/1965 | Starp | 95—10 |

NORTON ANSHER, *Primary Examiner.*

J. F. PETERS, JR., *Assistant Examiner.*

U.S. Cl. X.R.

95—64